US011881020B1

(12) United States Patent
Zhang et al.

(10) Patent No.: US 11,881,020 B1
(45) Date of Patent: Jan. 23, 2024

(54) METHOD FOR SMALL OBJECT DETECTION IN DRONE SCENE BASED ON DEEP LEARNING

(71) Applicant: NANJING UNIVERSITY OF POSTS AND TELECOMMUNICATIONS, Nanjing (CN)

(72) Inventors: Dengyin Zhang, Nanjin (CN); Yu Qiu, Nanjing (CN); Yingying Feng, Nanjing (CN)

(73) Assignee: NANJING UNIVERSITY OF POSTS AND TELECOMMUNICATIONS, Nanjing (CN)

( * ) Notice: Subject to any disclaimer, the term of this patent is extended or adjusted under 35 U.S.C. 154(b) by 0 days.

(21) Appl. No.: 18/326,999

(22) Filed: May 31, 2023

Related U.S. Application Data (63) Continuation of application No. PCT/CN2023/086257, filed on Apr. 4, 2023.

(30) Foreign Application Priority Data

Nov. 24, 2022 (CN) .......................... 202211481338.4

(51) Int. Cl.
```
G06V 10/74      (2022.01)
G06V 20/17      (2022.01)
G06V 10/77      (2022.01)
G06V 10/80      (2022.01)
G06V 10/762     (2022.01)
```
(Continued)

(52) U.S. Cl.
CPC ............... *G06V 20/17* (2022.01); *G06T 5/50* (2013.01); *G06V 10/762* (2022.01); *G06V 10/774* (2022.01); *G06V 10/7715* (2022.01); *G06V 10/806* (2022.01); *G06V 10/95* (2022.01); *G06T 2207/20081* (2013.01)

(58) Field of Classification Search
CPC .. G06V 20/17; G06V 10/762; G06V 10/7715; G06V 10/774; G06V 10/806; G06V 10/95; G06T 5/50; G06T 2207/20081
See application file for complete search history.

(56) References Cited

U.S. PATENT DOCUMENTS 11,222,217 B1    1/2022   Zhang et al.

FOREIGN PATENT DOCUMENTS

| CN | 112507840 A | 3/2021 |
|----|-------------|--------|
| CN | 113378905 A | 9/2021 |

(Continued)

*Primary Examiner* — Samir A Ahmed
(74) *Attorney, Agent, or Firm* — Nitin Kaushik (57) ABSTRACT

A method for small object detection in drone scene based on deep learning is provided, which includes: inputting images captured by a drone into a pre-trained generator based on an Unet network structure to output normal-light images; inputting the normal-light images into a object detection backbone network to output a plurality of multidimensional matrix feature maps, wherein the object detection backbone network integrates a channel attention mechanism and a spatial attention mechanism based on convolutional block Self-Block, and a 7*7 large convolutional kernel is used; inputting the plurality of multidimensional matrix feature maps into a BiFPN-S module of a feature pyramid for feature fusion, so as to output a plurality of corresponding feature maps for predicting objects of different sizes.

8 Claims, 7 Drawing Sheets

(51) Int. Cl.
*G06T 5/50* (2006.01)
*G06V 10/94* (2022.01)
*G06V 10/774* (2022.01)

(56) References Cited

FOREIGN PATENT DOCUMENTS

| | | | |
|---|---|---|---|
| CN | 114049538 A | | 2/2022 |
| CN | 114186697 A | | 3/2022 |
| CN | 114581799 A | | 6/2022 |
| CN | 115565089 A | * | 1/2023 |
| CN | 115719457 A | | 2/2023 |

\* cited by examiner

METHOD FOR SMALL OBJECT DETECTION IN DRONE SCENE BASED ON DEEP LEARNING

CROSS-REFERENCE TO RELATED APPLICATIONS

This application is a continuation of International Application No. PCT/CN2023/086257 with a filling date of Apr. 4, 2023, designating the United states, now pending, and further claims to the benefit of priority from Chinese Application No. 202211481338.4 with a filing date of Nov. 24, 2022. The content of the aforementioned applications, including any intervening amendments thereto, are incorporated herein by reference.

TECHNICAL FIELD

The present disclosure relates to the field of object detection in computer vision, in particular to a method for small object detection in drone scene based on deep learning.

BACKGROUND

The drone industry is rapidly developing and playing an important role in fields such as industry, agriculture, and military. The images transmitted by drones can provide more information than ground photography. At present, there are two problems with small object detection methods in drone scene: the drone image is susceptible to the influence of light or body angle, resulting in gray images and the loss of detailed information of small objects; the current detection network has poor performance in small object detection.

If the drone image is directly used for detection without preprocessing, exposure issues often occur due to poor natural light or inappropriate drone position, which can lose some details of small objects and have a negative impact on subsequent detection.

The traditional low-light enhancement methods are generally based on histogram equalization or Retinex module and other methods, which are slow in processing speed and low in self-adaptability, and cannot meet the requirements of subsequent detection for accuracy and real-time. While deep learning based low-light enhancement methods mostly rely on paired datasets for training, which is complex. The drone shooting objects are generally small, due to the small objects with limited size, limited appearance and geometric clues and low discrimination from the background, the accuracy of general methods for detecting small objects is not high, resulting in unsatisfactory results when applied in drone scene. So, how to optimize the detection of small objects is a challenging task in the field of computer vision.

SUMMARY

The objective of the present disclosure is to provide a method for small object detection in drone scene based on deep learning. The method uses deep learning in both the enhancement and detection parts, solving the disadvantages of slow speed and low accuracy in traditional methods. At the same time, improvements are made to the existing object detection network to make the method suitable for drone scenes, solving the problem of small object detection in low-light images, and improving the performance of small object detection.

A method for small object detection in drone scene based on deep learning, including:

inputting images captured by a drone into a pre-trained generator based on an Unet network structure to output normal-light images;

inputting the normal-light images into an object detection backbone network to output a plurality of multidimensional matrix feature maps, wherein the object detection backbone network integrates a channel attention mechanism and a spatial attention mechanism based on convolutional block Self-Block, and a 7*7 large convolutional kernel is used;

inputting the plurality of multidimensional matrix feature maps into a BiFPN-S module of a feature pyramid for feature fusion, so as to output a plurality of corresponding feature maps for predicting objects of different sizes.

Further, a training method of the pre-trained generator includes:

selecting low-light images and the normal-light images;

inputting the low-light images and the normal-light images into a discriminator and a generator to generate more realistic images through the generator under a guidance of the discriminator;

applying alternating training to the generator and a relative discriminator to generate images that infinitely approximate the normal-light images, and the generator is used as the pre-trained generator.

Further, a structural formula of the discriminator is as follows:

$$D_{(X_r, X_f)} = \sigma\left(C_{(X_r)} - E_{X_f \sim P_{(X_f)}}\left[C_{(X_f)}\right]\right) \qquad (1)$$

$$D_{(X_f, X_r)} = \sigma\left(C_{(X_f)} - E_{X_r \sim P_{(X_r)}}[C_{(X_r)}]\right) \qquad (2)$$

wherein, $X_r$ represents sampling from a normal image, $X_f$ represents sampling from an image generated by the generator, $\sigma$ represents a sigmoid function, $C(x)$ represents a probability that an image is a real normal-light image, and $E(x)$ represents a mathematical expectation.

Further, a loss function of the generator $Loss_D$ is as follows:

$$Loss_G = E_{X_f \sim P_{(X_f)}}\left[\left(D_{(X_f, X_r)} - 1\right)^2\right] + E_{X_r \sim P_{(X_r)}}\left[D^2_{(X_r, X_f)}\right] \qquad (3)$$

$E(x)$ represents a mathematical expectation, and D represents an output of the discriminator.

Further, a loss function of the discriminator $Loss_D$ is as follows:

$$Loss_D = E_{X_r \sim P_{(X_r)}}\left[\left(D_{(X_r, X_f)} - 1\right)^2\right] + E_{X_f \sim P_{(X_f)}}\left[D^2_{(X_f, X_r)}\right] \qquad (4)$$

$E(x)$ represents a mathematical expectation, and D represents an output of the discriminator.

Further, an equivalent formula of the channel attention mechanism is as follows:

$$w = \sigma(C1D[\text{AugPool}(y); \text{Maxpool}(x)]) \qquad (5)$$

wherein, AugPool(y) represents a 1*1*C matrix after global average pooling, MaxPool(x) represents a 1*1*C matrix after maximum pooling, CM represents one-dimensional convolution operation, and a represents a sigmoid function.

Further, a equivalent formula of the spatial attention mechanism is as follows:

$$w = \sigma(Conv^{7*7}[AugPool(y); MaxPool(x)]) \quad (6)$$

wherein, AugPool(y) represents a H*W*C matrix after global average pooling, MaxPool(x) represents a H*W*C matrix after maximum pooling, $Conv^{7*7}$ represents a convolution operation with a kernel size of 7*7, and σ represents a sigmoid function.

Further, the method further includes:

applying K-means clustering algorithm to re-cluster the detected objects in the images captured by the drone.

Compared with the related arts, the advantageous effects achieved by the present disclosure are as following:

(1) The present disclosure uses a deep learning method in the preprocessing stage, and trains an Unet network structure generator through generative adversarial network, which can adaptively handle the problem of image grayness caused by poor natural light or inappropriate drone position. It overcomes the drawbacks of traditional low-light enhancement modules such as slow processing speed and low adaptability, while also avoiding the problem of most current deep learning methods relying on paired datasets for training. In addition, the adaptability of the network can be enhanced by filtering training images in different situations to improve the performance of small object detection.

(2) The present disclosure provides a new convolutional block Self-Block for a backbone network of the object detection by integrating attention mechanisms, which can increase detection performance at a small cost. Compared with the commonly used 3*3 small convolution block, Self-Block has a larger receptive field and the ability to focus on key objects, which is helpful for small object detection.

(3) The present disclosure provides a simplified feature pyramid (BiFPN-S) based on BiFPN for feature fusion. Modern feature pyramids generally have the drawbacks of high computational complexity (such as PANet) or insufficient fusion (such as FPN). And BiFPN-S achieves an efficient and fully fused feature pyramid structure by adding residual structures and reducing unnecessary fusion points, which can improve the performance of small object detection.

The advantage of the present disclosure is that it uses a deep learning method for small object detection, combined with mature convolution operation technology of computers and the efficient computing performance of GPUs, achieving fast detection speed and high accuracy. By applying the Unet network structure generator to preprocess drone images, it can adaptively process low-light scenes under different conditions, so as to reduce interference to small object detection. Self-Block is used as the convolutional block of Backbone to improve network performance. BiFPN-S is used for feature fusion, which can preserve enrich semantic information and feature clues of small objects at the same time, greatly improving the performance of small object detection.

DETAILED DESCRIPTION OF THE EMBODIMENTS

In order to facilitate a clear understanding of the technical means, creative features, objectives, and effects of the present disclosure, the following will further elaborate on the present disclosure in conjunction with specific embodiment.

Figure 1:
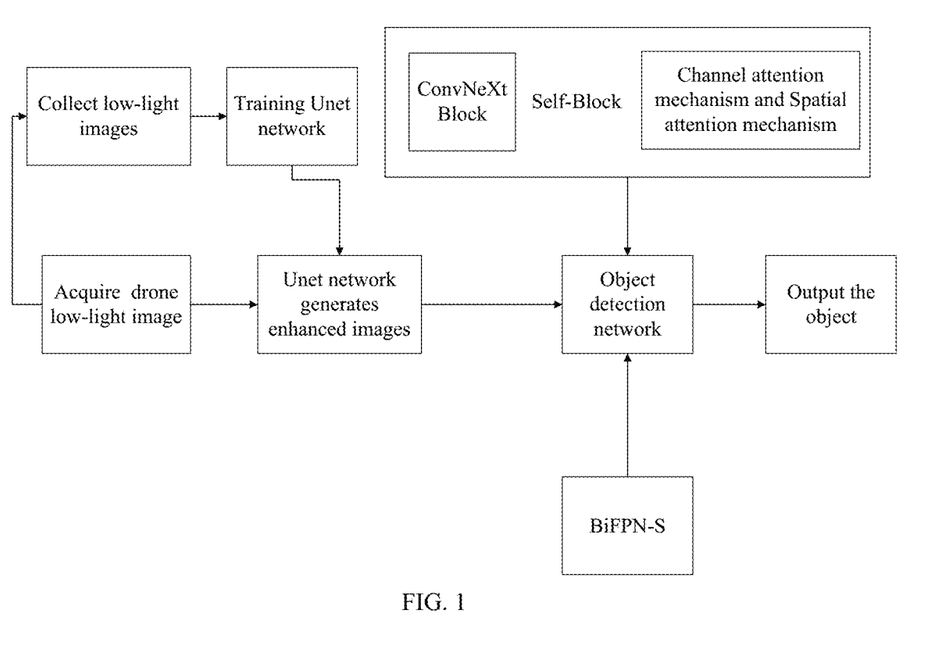
FIG. 1 is a flowchart of the method of the present disclosure.
Figure 2:
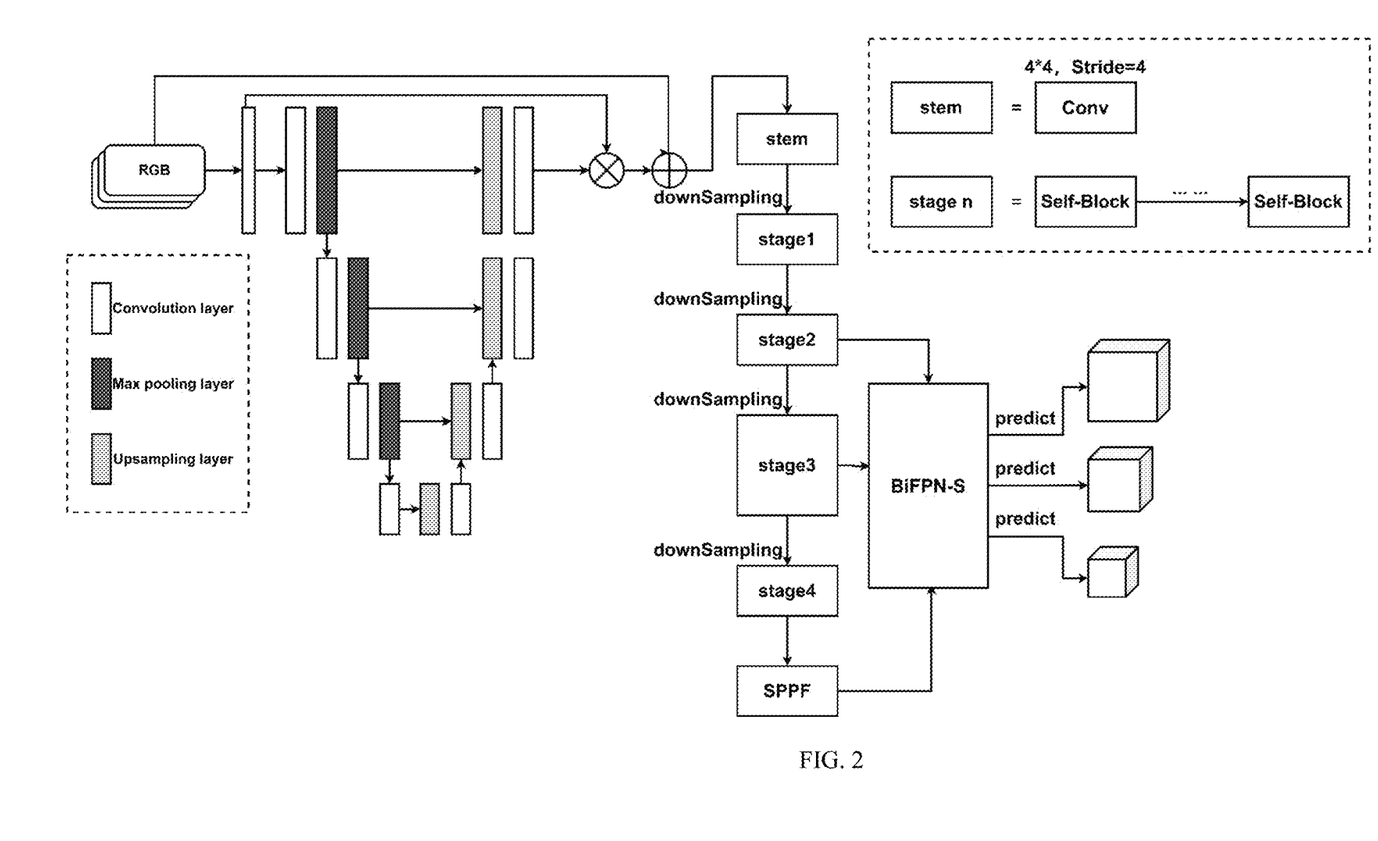
FIG. 2 is a schematic diagram of the overall network framework of the present disclosure.

As shown in FIG. 2, the present disclosure provides a method for small object detection in drone scene based on deep learning, which includes two parts: a preprocessing network and a detection network.

The preprocessing network is trained through generative adversarial network methods, and Self-Block convolutional blocks and BiFPN-S feature pyramids are introduced into the detection network to improve network performance and small object detection accuracy. The following is a detailed description of the implementation methods and functions of each module:

The first step, to adaptively enhance low-light images, selecting 500-1000 low-light images based on the images or videos transmitted by the drone, and then selecting 1000 normally exposed images (this image does not need to be matched with the drone image, any normally exposed image can be used). Then, the two datasets are placed in the generative adversarial network for training.

Figure 3:
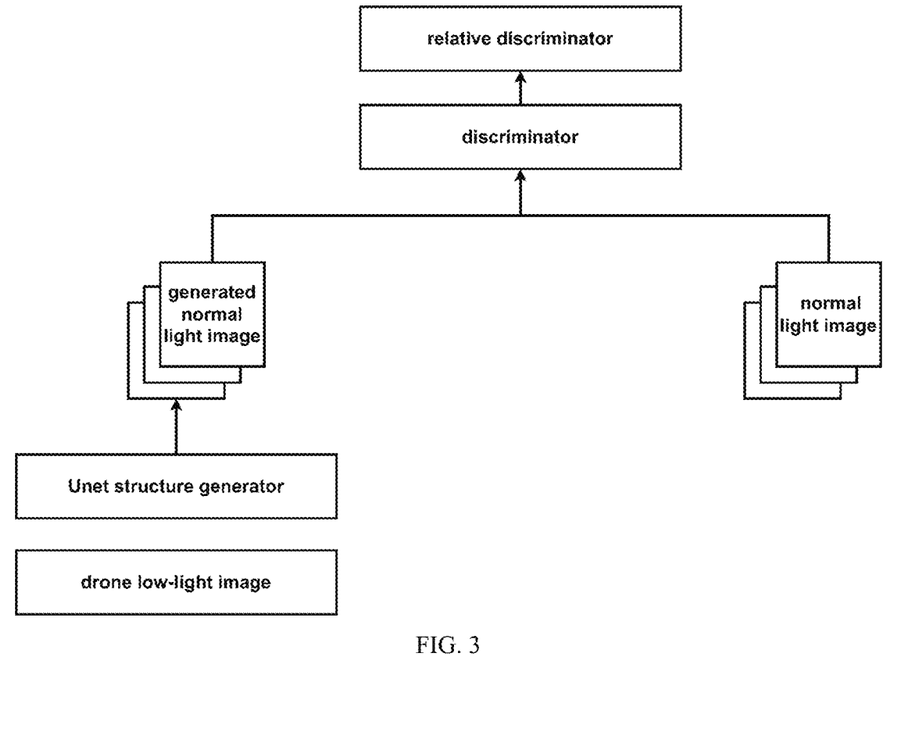
FIG. 3 is a schematic diagram of the training process of the generator of the present disclosure.

The training process is shown in FIG. 3, on the basis of discriminator C, a relative discriminator structure is adopted, which can estimate the probability that a normal-light image is more realistic than the generated image and guide the generator to generate a more realistic image. The formula for the relative discriminator structure is as follows:

$$D_{(X_r, X_f)} = \sigma\left(C_{(X_r)} - E_{X_f \sim P_{(X_f)}}\left[C_{(X_f)}\right]\right) \quad (1)$$

$$D_{(X_f, X_r)} = \sigma\left(C_{(X_f)} - E_{X_r \sim P_{(X_r)}}[C_{(X_r)}]\right) \quad (2)$$

Wherein, $X_r$ represents sampling from a normal image, $X_f$ represents sampling from an image generated by the generator, σ represents a sigmoid function, C(x) represents a probability that an image is a real normal-light image, and E(x) represents a mathematical expectation.

Alternating training is applied to the generator and a relative discriminator to make the generated images that infinitely approximate the normal-light images. The loss function of the generator $LOSS_G$ and the loss function of the relative discriminator $Loss_D$ are as follows:

$$Loss_G = E_{X_f \sim P_{(X_f)}}\left[\left(D_{(X_f, X_r)} - 1\right)^2\right] + E_{X_r \sim P_{(X_r)}}\left[D^2_{(X_r, X_f)}\right] \quad (3)$$

$$\text{Loss}_D = E_{X_r \sim P_{(X_r)}}\left[\left(D_{(X_r, X_f)} - 1\right)^2\right] + E_{X_f \sim P_{(X_f)}}\left[D^2_{(X_f, X_r)}\right] \quad (4)$$

E(x) represents a mathematical expectation, and D represents an output of the discriminator.

After training, the generator part can be taken out separately. If the trained generator does not have ideal enhancement effect in a specific scene, it can be retrained using the low-light images of the scene to obtain a generator that is suitable for the scene. So this enhancement method has adaptability that traditional methods do not have.

The second step, the output of the generator is connected to the object detection network. The object detection backbone network integrates the ConvNeXt network and feature pyramid ideas on basis of Yolov5 network, so as to provide an efficient, real-time and end-to-end object detection network.

Firstly, the stem of Yolov5 is simplified into a layer of 4*4 small convolutional kernels. Because shallow features mainly consist of stripes and shapes, an overly complex stem does not enhance detection performance, but rather increase computational complexity. Therefore, a small convolutional kernel is used to extract shallow features.

Figure 4:
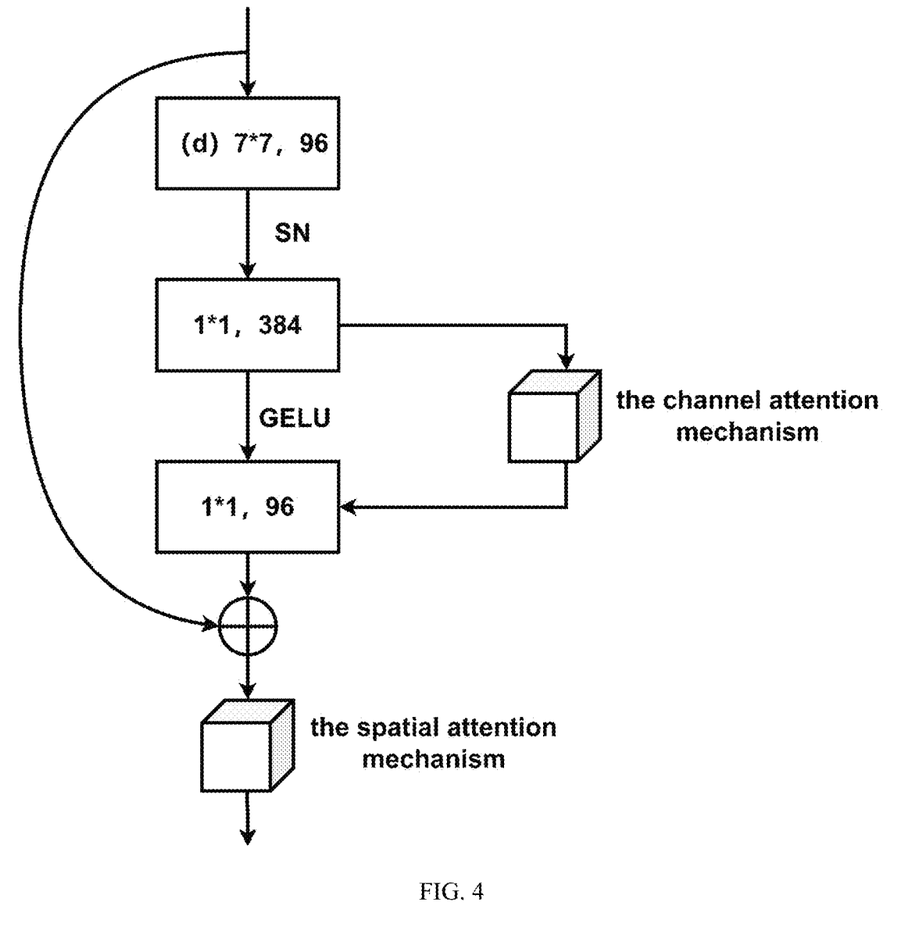
FIG. 4 is a schematic diagram of the Self-Block structure of the present disclosure.
Figure 5:
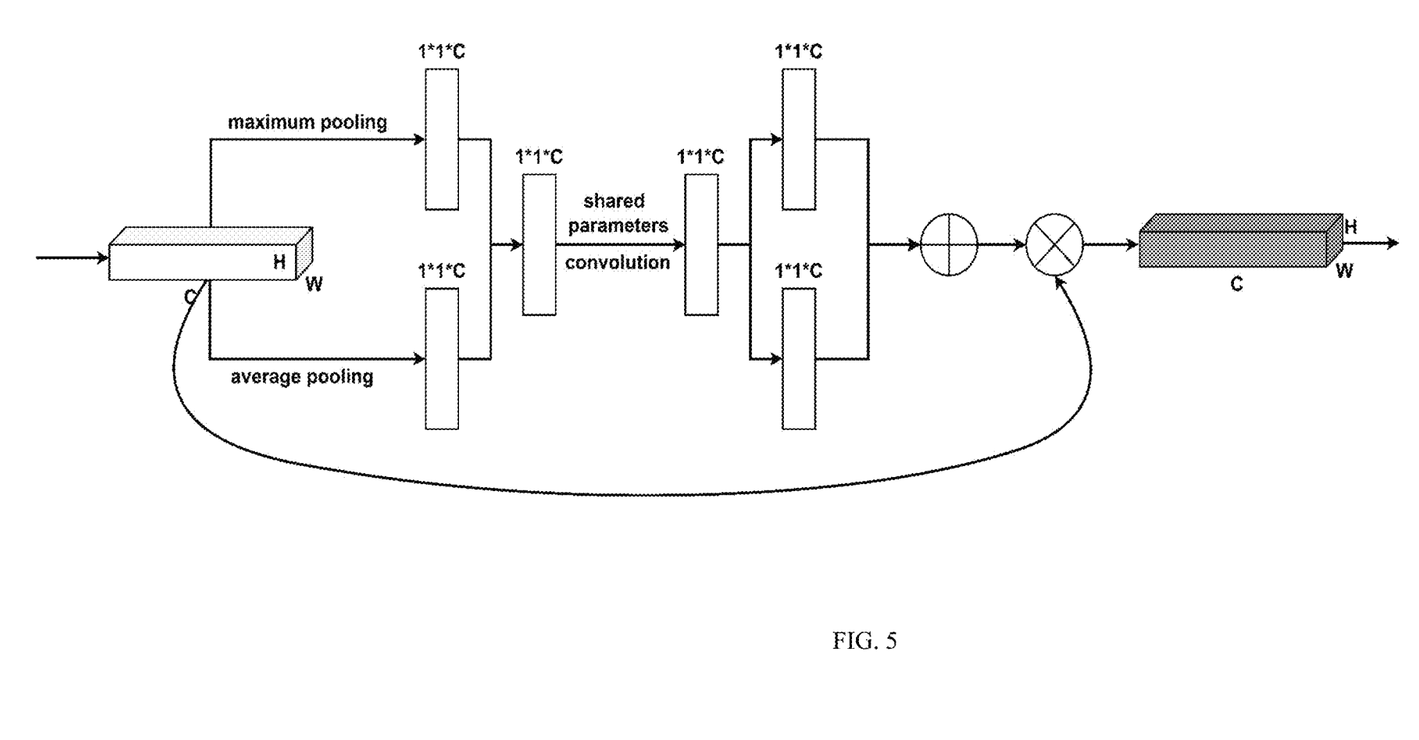
FIG. 5 is a schematic diagram of the channel attention structure of the present disclosure.

Secondly, the number of layers in the four stages of the backbone network is set to (3, 3, 9, 3), and each layer is composed of convolutional blocks Self-Block connected in series. The schematic diagram of Self-Block structure is shown in FIG. 4. At present, the convolutional blocks in mainstream networks are generally stacked with multiple 3*3 convolutional kernels, as this can accelerate operations. Self-Block is based on the ConvNeXt Block, using a 7*7 large convolutional kernel in the way of depthwise separable convolution. The 7*7 large convolution kernel can provide a larger and more effective receptive field than 3*3 stacked convolution kernels, providing better performance for downstream small object detection. The depthwise separable convolution can accelerate the operation of large convolution kernels. The parameter quantity of the 7*7 convolution kernel is much larger than that of the 3*3 convolution kernel, but the actual operation speed is only slightly slower, and the detection performance is greatly improved. In addition, the depthwise separable convolution can also separate spatial and channel features, which is consistent with the current high-performance Swin Transformer model. On this basis, the channel attention mechanism and the spatial attention mechanism are integrated into the Self-Block module, and the two attention modules are separated and placed in different parts, which not only strengthens the characteristics of "separating spatial features and channel features", but also allows the network to focus on the characteristics of small objects. The structure of the channel attention mechanism is shown in FIG. 5, since the fully connection method is abandoned between two one-dimensional arrays and the parameters are shared through convolution, it is possible to focus on the key channels of the feature map with minimal computational complexity. The equivalent formula is as follows:

$$w = \sigma(C1D[\text{AugPool}(y); \text{MaxPool}(x)]) \quad (5)$$

Figure 6:
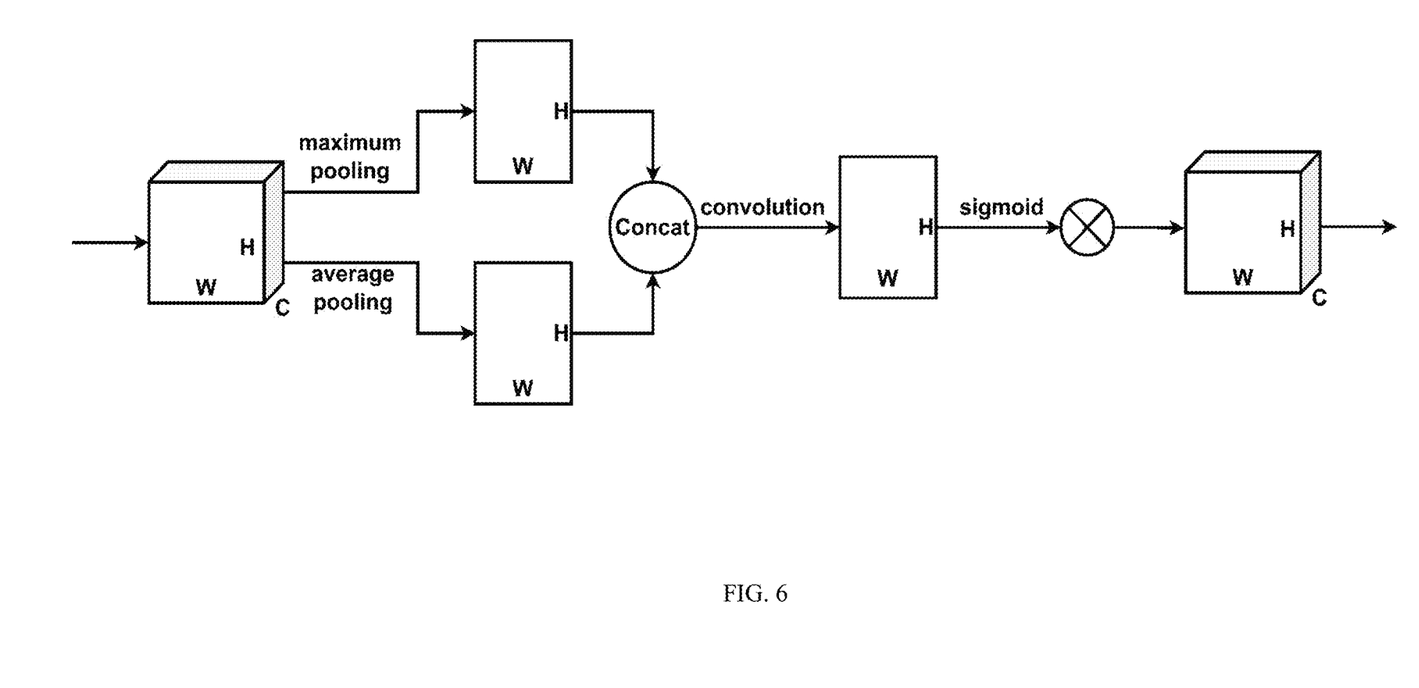
FIG. 6 is a schematic diagram of the spatial attention structure of the present disclosure.

Wherein, AugPool(y) represents a 1*1*C matrix after global average pooling, MaxPool(x) represents a 1*1*C matrix after maximum pooling, CM represents one-dimensional convolution operation, and a represents a sigmoid function. The structure of the spatial attention mechanism is shown in FIG. 6. Simultaneously using average pooling and maximum pooling to pool features can maximize the representation ability of the network and focus on the key spatial location regions of the feature map. The equivalent formula is as follows:

$$w = \sigma(\text{Conv}^{7*7}[\text{AugPool}(y); \text{MaxPool}(x)]) \quad (6)$$

Wherein, AugPool(y) represents a H*W*C matrix after global average pooling, MaxPool(x) represents a H*W*C matrix after maximum pooling, Conv$^{7*7}$ represents a convolution operation with a kernel size of 7*7, and σ represents a sigmoid function.

Then, replacing the BN normalization in currently mainstream with SN (Switchable Normalization). At present, there are normalization methods such as BN, LN, IN, GN, etc., there will be different optimal choices when facing different network structures and scenarios. How to achieve the optimal results requires a large number of control experiments. SN is a differentiable normalization layer that allows the module to learn the normalization method to be selected for each layer or the weighted sum of three normalization methods based on data, thereby improving the performance of the module.

Figure 7:
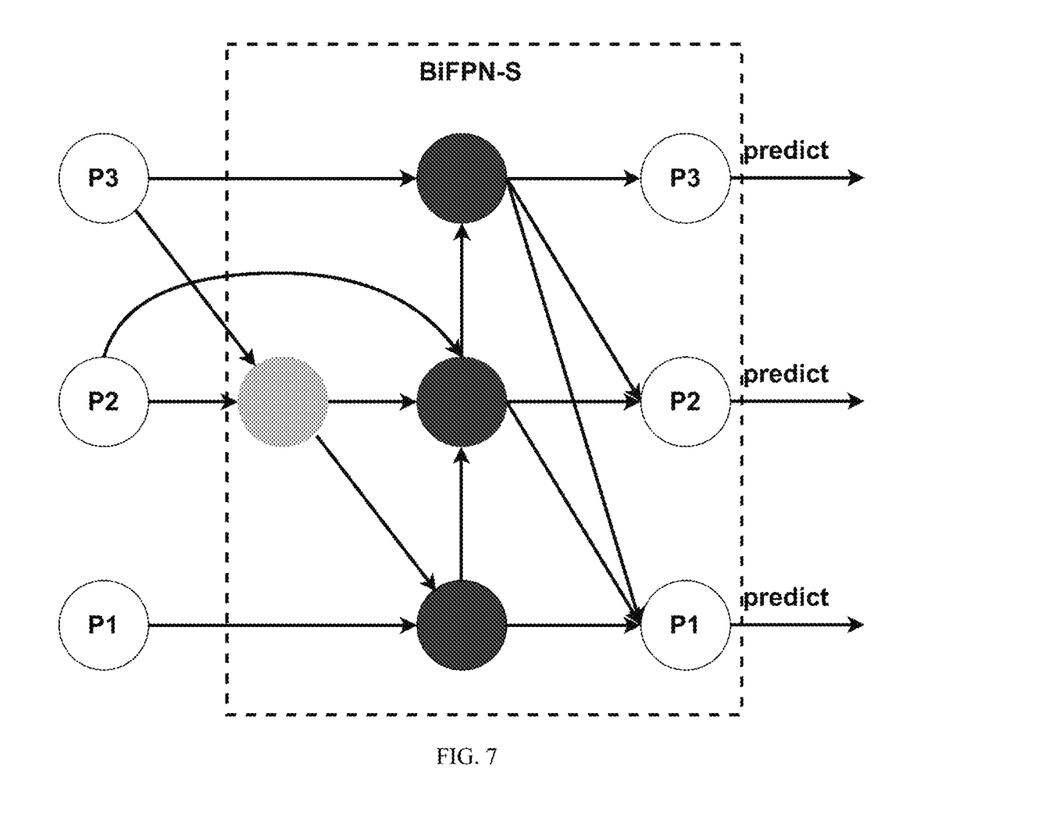
FIG. 7 is a schematic diagram of the BiFPN-S structure of the present disclosure.

Next, inputting the feature maps from different stages into the feature pyramid (BiFPN-S) for feature fusion, and the structure of BiFPN-S is shown in FIG. 7. Modern feature pyramids generally have the drawbacks of high computational complexity or insufficient fusion, so the present disclosure proposes BiFPN-S for feature fusion based on BiFPN. To overcome the disadvantage of high computational complexity in feature fusion, BiFPN-S removed the feature fusion of the upper and lower sides of the feature maps in the first stage, as the information on both sides is single in this stage, which contributes less to the final fusion and increases the computational complexity. In order to overcome the disadvantage of non-repetition in fusion, BiFPNS-S performs a second feature fusion in the second stage, in order to fully fuse shallow and deep information. In addition, BiFPN-S also enhances the representation ability of features through residual connections. Using the fused feature maps for prediction can greatly improve the performance of small object detection.

Because the objects in the drone images are generally small, and the universal Anchor size is not applicable, the K-means clustering algorithm is used to re-cluster the detected objects before training the network. Finally, the detection network of the disclosure is trained with Yolov5 training method. The loss function Loss of the whole network is as follows:

$$\text{Loss} = \varphi_1 L_{cls} + \varphi_2 L_{obj} + \varphi_3 L_{loc} \quad (7)$$

Wherein, $L_{cls}$ is classification loss, $L_{obj}$ is confidence loss, $L_{loc}$ is positioning loss, and $\varphi_1$, $\varphi_2$, $\varphi_3$ are equilibrium coefficients respectively.

The system provided by the present disclosure has the advantages of:

(1) By training an Unet network structure generator through generative adversarial network, it can adaptively handle exposure issues caused by poor natural light or inappropriate drone positions.

(2) The use of Self-Block and BiFPN-S in detection networks can improve network performance and improve the accuracy of small object detection.

The present disclosure discloses a method for small object detection in drone scene based on deep learning, which can improve the performance of small object detection and cope with the interference of low-light caused by poor natural light or unsuitable drone angles on small object detection.

The description above is only a specific embodiment in the present disclosure patent, but the scope of the present disclosure is not limited to these. Any skilled person in the art should understand that any transformation or substitution made on the present disclosure within the principle of the disclosed technology should be included in the scope of the present disclosure. Therefore, the scope of the present disclosure should be subject to the protection scope of the claims.

The description above are only the preferred embodiment of the present disclosure. It should be pointed out that for ordinary skilled person in the art, several improvements and modifications can be made without departing from the technical principles of the present disclosure. These improvements and modifications should also be considered as the scope of the present disclosure.

What is claimed is:

1. A method for small object detection in drone scene based on deep learning, comprising:
   inputting images captured by a drone into a pre-trained generator based on an Unet network structure to output normal-light images;
   inputting the normal-light images into a object detection backbone network to output a plurality of multidimensional matrix feature maps, wherein the object detection backbone network integrates a channel attention mechanism and a spatial attention mechanism based on convolutional block Self-Block, and a 7*7 large convolutional kernel is used;
   inputting the plurality of multidimensional matrix feature maps into a BiFPN-S module of a feature pyramid for feature fusion, so as to output a plurality of corresponding feature maps for predicting objects of different sizes.

2. The method for small object detection in drone scene based on deep learning according to claim 1, wherein a training method of the pre-trained generator comprises:
   selecting low-light images and the normal-light images;
   inputting the low-light images and the normal-light images into a discriminator and a generator to generate more realistic images through the generator under a guidance of the discriminator;
   applying alternating training to the generator and a relative discriminator to generate images that infinitely approximate the normal-light images, and the generator is used as the pre-trained generator.

3. The method for small object detection in drone scene based on deep learning according to claim 2, wherein a structural formula of the discriminator is as follows:

$$D(x_r, x_f) = \sigma(C(x_r) - E_{x_f \sim p(x_f)}[C(x_f)]) \quad (1)$$

$$D(x_f, x_r) = \sigma(C(x_f) - E_{x_r \sim p(x_r)}[C(x_r)]) \quad (2)$$

wherein, $x_r$ represents sampling from a normal image, $x_f$ represents sampling from an image generated by the generator, $\sigma$ represents a sigmoid function, $C(x)$ represents a probability that an image is a real normal-light image, and $E(x)$ represents a mathematical expectation.

4. The method for small object detection in drone scene based on deep learning according to claim 2, wherein a loss function of the generator $Loss_G$ is as follows:

$$Loss_G = E_{x_f \sim p(x_f)}[(D(x_f, x_r) - 1)^2] + E_{x_r \sim p(x_r)}[D(x_r, x_f)^2] \quad (3)$$

$E(x)$ represents a mathematical expectation, and D represents an output of the discriminator.

5. The method for small object detection in drone scene based on deep learning according to claim 2, wherein a loss function of the discriminator $Loss_D$ is as follows:

$$Loss_D = E_{x_r \sim p(x_r)}[(D(x_r, x_f) - 1)^2] + E_{x_f \sim p(x_f)}[D(x_f, x_r)^2] \quad (4)$$

$E(x)$ represents a mathematical expectation, and D represents an output of the discriminator.

6. The method for small object detection in drone scene based on deep learning according to claim 1, wherein an equivalent formula of the channel attention mechanism is as follows:

$$w = \sigma(C1D[AugPool(y); MaxPool(x)]) \quad (5)$$

wherein, AugPool(y) represents a 1*1*C matrix after global average pooling, MaxPool(x) represents a 1*1*C matrix after maximum pooling, C1D represents one-dimensional convolution operation, and $\sigma$ represents a sigmoid function.

7. The method for small object detection in drone scene based on deep learning according to claim 1, wherein a equivalent formula of the spatial attention mechanism is as follows:

$$W = \sigma(Conv^{7*7}[AugPool(y); MaxPool(x)]) \quad (6)$$

wherein, AugPool(y) represents a H*W*C matrix after global average pooling, MaxPool(x) represents a H*W*C matrix after maximum pooling, $Conv^{7*7}$ represents a convolution operation with a kernel size of 7*7, and $\sigma$ represents a sigmoid function.

8. The method for small object detection in drone scene based on deep learning according to claim 1, wherein the method further comprises:
   applying K-means clustering algorithm to re-cluster detected objects in the images captured by the drone.

* * * * *